United States Patent
Honna et al.

(10) Patent No.: US 12,158,892 B2
(45) Date of Patent: Dec. 3, 2024

(54) MACHINE LEARNING BASED METHOD AND SYSTEM FOR TRANSFORMING DATA

(71) Applicant: INFOSYS LIMITED, Bangalore (IN)

(72) Inventors: Megha Honna, Cary, NC (US); Rajeshwari Ganesan, Palo Alto, CA (US)

(73) Assignee: Infosys Limited, Bangalore (IN)

( * ) Notice: Subject to any disclaimer, the term of this patent is extended or adjusted under 35 U.S.C. 154(b) by 25 days.

(21) Appl. No.: 17/991,619

(22) Filed: Nov. 21, 2022

(65) Prior Publication Data

US 2024/0168968 A1    May 23, 2024

(51) Int. Cl.
*G06F 16/25* (2019.01)
*G06F 16/22* (2019.01)

(52) U.S. Cl.
CPC ........ *G06F 16/254* (2019.01); *G06F 16/2282* (2019.01); *G06F 16/258* (2019.01)

(58) Field of Classification Search
CPC ...... G06F 40/258; G06F 40/18; G06F 16/254; G06F 16/2282
USPC ........................................................ 707/602
See application file for complete search history.

(56) References Cited

U.S. PATENT DOCUMENTS 9,142,138 B2 * 9/2015 Scanlan ................ G06F 3/0483
11,514,258 B2 * 11/2022 Nadim ................... G06N 20/00
2020/0081899 A1 3/2020 Shapur et al.
2020/0334250 A1 10/2020 Canim et al.
2023/0085358 A1 * 3/2023 Al-Eryani ............ C12Q 1/6886
435/6.14

OTHER PUBLICATIONS

Fang, et al: Table Header Detection and Classification, Proceedings of the Twenty-Sixth AAAI Conference on Artificial Intelligence, Jul. 22, 2012.
N. Milošević, A Multi-Layered Approach to Information Extraction from Tables in Biomedical Documents (A Thesis Submitted to the University of Manchester) 2018.
Wenzel, et al: Precise Table Recognition by Making Use of Reference Tables, pp. 283-294; Documents Analysis Systems: Theory and Practice by Seong-Whan Lee and Yasuaki Nakano, copyright 1998.
Europe Patent Application No. 22212992.6, Extended European Search Report, dated Sep. 12, 2023.

* cited by examiner

*Primary Examiner* — Hung T Vy
(74) *Attorney, Agent, or Firm* — Finnegan, Henderson, Farabow, Garrett & Dunner LLP

(57) ABSTRACT

A method for transforming data organized in tabular structure is disclosed. In some embodiments, the method includes assigning a score to each of a plurality of cells within a table based on an associated set of orthogonal features characterizing a set of data. The set of orthogonal features comprises visual features, syntactic features, and language-based features. The method further includes identifying for each of the plurality of cells, a cell type based on the assigned score. The method further includes determining a table type based on the cell type and the set of orthogonal features determined for each of the plurality of cells. The table type comprises one of a row-oriented table, a column-oriented table, or a composite table.

14 Claims, 19 Drawing Sheets

Table A : DC133_XX01

| Reservoir | Net Sand | Net Pay | Vsh | Phie | Swe | OB Perm | Kh (md-ft) |
|---|---|---|---|---|---|---|---|
| Unnamed Sd | 14 | 13 | 19.8% | 34.5% | 25.00% | -999.25 | -12990.3 |
| M57 Sd | 76 | 76 | 8.30% | 30.9% | 14.70% | 2606 | 196790.5 |
| M57 LAM Sd | 6 | 6 | 23.50% | 29.20% | 42.80% | 652 | 3584.9 |
| M55 LAM Sd | 16 | 16 | 17.20% | 27.5% | 32.0% | 1519 | 24307.2 |
| M55 Sd | 273 | 273 | 9.70% | 29.4% | 18.6% | 2122 | 579401.1 |
| M55 LOWER | 23 | 22 | 15.90% | 26.60% | 32.40% | 978 | 21021.2 |
| M54 Sd | 258 | 258 | 6.30% | 29.9% | 12.4% | 2054 | 529899.6 |
| Sd below M54 Sd | 22 | 22 | 9.40% | 28.8% | 34% | 1847 | 39700.5 |
| Average | 86 | | | | | | |

| Table A | Reservoir | Net Sand | Net Pay | Vsh | Phie | Swe | OB Perm | Kh (md-ft) |
|---|---|---|---|---|---|---|---|---|
| DC133_XX01 | Unnamed Sd | 14 | 13 | 19.8% | 34.5% | 25.00% | -999.25 | -12990.3 |
| DC133_XX01 | M57 Sd | 76 | 76 | 8.30% | 30.9% | 14.70% | 2606 | 196790.5 |
| DC133_XX01 | M57 LAM Sd | 6 | 6 | 23.50% | 29.20% | 42.80% | 652 | 3584.9 |
| DC133_XX01 | M55 LAM Sd | 16 | 16 | 17.20% | 27.5% | 32.0% | 1519 | 24307.2 |
| DC133_XX01 | M55 Sd | 273 | 273 | 9.70% | 29.4% | 18.6% | 2122 | 579401.1 |
| DC133_XX01 | M55 LOWER | 23 | 22 | 15.90% | 26.60% | 32.40% | 978 | 21021.2 |
| DC133_XX01 | M54 Sd | 258 | 258 | 6.30% | 29.9% | 12.4% | 2054 | 529899.6 |
| DC133_XX01 | Sd below M54 Sd | 22 | 22 | 9.40% | 28.8% | 34% | 1847 | 39700.5 |
| DC133_XX01 | Average | 86 | | | | | | |

FIG. 4B

| Cell Identification | | | | | | | |
|---|---|---|---|---|---|---|---|
| (KEY) | (KEY) | (KEY) | (KEY) | (KEY) | (KEY) | (KEY) | (KEY) |
| (VALUE) | (VALUE) | (VALUE) | (VALUE) | (VALUE) | (VALUE) | (VALUE) | (VALUE) |
| (VALUE) | (VALUE) | (VALUE) | (VALUE) | (VALUE) | (VALUE) | (VALUE) | (VALUE) |
| (VALUE) | (VALUE) | (VALUE) | (VALUE) | (VALUE) | (VALUE) | (VALUE) | (VALUE) |
| (VALUE) | (VALUE) | (VALUE) | (VALUE) | (VALUE) | (VALUE) | (VALUE) | (VALUE) |
| (VALUE) | (VALUE) | (VALUE) | (VALUE) | (VALUE) | (VALUE) | (VALUE) | (VALUE) |
| (VALUE) | (VALUE) | (VALUE) | (VALUE) | (VALUE) | (VALUE) | (VALUE) | (VALUE) |
| (VALUE) | (VALUE) | (VALUE) | (VALUE) | (VALUE) | (VALUE) | (VALUE) | (VALUE) |
| (VALUE) | (VALUE) | (NULL) | (NULL) | (NULL) | (NULL) | (NULL) | (NULL) |
| (VALUE) | | | | | | | |

FIG. 9

Table A : DC133_XX01

| Reservoir | Net Sand | Net Pay | Vsh | Phie | Swe | OB Perm | Kh (md-ft) |
|---|---|---|---|---|---|---|---|
| Unnamed Sd | 14 | 13 | 19.8% | 34.5% | 25.00% | -999.25 | -12990.3 |
| M57 Sd | 76 | 76 | 8.30% | 30.9% | 14.70% | 2606 | 196790.5 |
| M57 LAM Sd | 6 | 6 | 23.50% | 29.20% | 42.80% | 652 | 3584.9 |
| M55 LAM Sd | 16 | 16 | 17.20% | 27.5% | 32.0% | 1519 | 24307.2 |
| M55 Sd | 273 | 273 | 9.70% | 29.4% | 18.6% | 2122 | 579401.1 |
| M55 LOWER | 23 | 22 | 15.90% | 26.60% | 32.40% | 978 | 21021.2 |
| M54 Sd | 258 | 258 | 6.30% | 29.9% | 12.4% | 2054 | 529899.6 |
| Sd below M54 Sd | 22 | 22 | 9.40% | 28.8% | 34% | 1847 | 39700.5 |

Table B : C27 (CW27)

| Interval | Property | Prognosed | Actual | Comments |
|---|---|---|---|---|
| GB301N | Gross length (m) | 253 | 365 | |
| | Net length (m) | 100 | 23.6 | Net length in Gb303N is significantly lower than estimated due to depth uncertainty entering the geobody. LWD extra-deep reading resistivity tool (visiTrak) was used to geosteer the well |
| | Net to gross | 0.42 | 0.20 | |
| | Average net porosity (mD) | 0.31 | 0.27 | Finer grained sandstones and silty sandstones resulted in a lower average porosity for this channel complex than predicted |
| | Average arithmetic.net permeability (mD) | 1100 | 883 | Lower porositives encountered than predited and the poroperm relationship used to derive permeability, resulted in lower permeabilities than predicted |
| | Average water saturation | 0.14 | 0.26 | |
| GB266 | Gross length (m) | 332 | 479.6 | |
| | Net length (m) | 150 | 364 | |
| | Net to gross | 0.45 | 0.76 | |
| | Average net porosity (mD) | 0.31 | 0.27 | Finer grained sandstones and silty sandstones resulted in a lower average porosity for this channel complex than predicted |
| | Average arithmetic.net permeability (mD) | 1100 | 1130 | |
| | Average water saturation | 0.14 | 0.22 | |

| System of Records 1402C |||||| 
|---|---|---|---|---|---|
| Well Name | Reservoir | Net Sand | Net Pay | Porosity | Water Saturation |
| ……………. | ……………. | ………… | ………… | ………… | ………… |
| ……………. | ……………. | ………… | ………… | ………… | ………… |
| ……………. | ……………. | ………… | ………… | ………… | ………… |
| ……………. | ……………. | ………… | ………… | ………… | ………… |
| ……………. | ……………. | ………… | ………… | ………… | ………… |

| 1402A | 1402C |
|---|---|
| Key Cells | RHS (System of Records) |
| Table A | Well Name |
| Reservoir | Reservoir |
| Net Sand | Net Sand |
| Net Pay | Net Pay |
| Vsh | ERROR |
| Phie | Porosity |
| Swe | Water Saturation |
| OB Perm | ERROR |
| Kh (md-ft) | ERROR |

| 1402B | 1402C |
|---|---|
| Key Cells | RHS (System of Records) |
| Table B | Well Name |
| Interval | Reservoir |
| Gross Length (m) | Net Sand |
| Net Length (m) | Net Pay |
| Net to gross | ERROR |
| Average Net Porosity (mD) | Porosity |
| Average airthmetic net permeability (mD) | ERROR |
| Average water saturation | Water Saturation |

FIG. 14E

| Unique ID 1402F | | | | |
|---|---|---|---|---|
| #FDEF | #BBBB | #CDCE | #FDEC | #FDAB |
| Reservoir | Net Sand | Net Pay | Porosity | Water Saturation |
| Key: Reservoir Row-oriented (3,1) | Key: Net Sand Row-oriented (3,2) | Key: Net Pay Row-oriented (3,3) | Key: Phie Row-oriented (3,5) | Key: Swe Row-oriented (3,6) |
| Key: Interval<br><br>Column-oriented<br><br>(1,1) | Key: Gross Length - Actual<br><br>Column-oriented<br><br>(2,4) | Key: Net Length - (m)<br><br>Column-oriented<br><br>(3,4) | Key: Average Net Porosity<br><br>Column-oriented<br><br>(5,4) | Key: Average water saturation<br><br>Column-oriented<br><br>(7,4) |

| System of Records 1402C ||||||
|---|---|---|---|---|---|
| Well Name | Reservoir | Net Sand | Net Pay | Porosity | Water Saturation |
| DC133_XX01 | Unnamed Sd | 14 | 13 | 34.5 | 25 |
| DC133_XX01 | M57 Sd | 76 | 76 | 30.9 | 14.7 |
| DC133_XX01 | M57 LAM Sd | 6 | 6 | 29.2 | 42.8 |
| DC133_XX01 | M57 LAM Sd | 16 | 16 | 27.5 | 32 |
| DC133_XX01 | M55 Sd | 273 | 273 | 29.4 | 18.6 |
| DC133_XX01 | M55 LOWER | 23 | 22 | 26.6 | 32.4 |
| DC133_XX01 | M54 Sd | 258 | 258 | 29.9 | 12.4 |
| DC133_XX01 | Sd below M53 Sd | 22 | 22 | 28.8 | 34.3 |
| C27 (CW27) | GB301N | 365 | 73.6 | 0.27 | 0.26 |
| C27 (CW27) | GB266 | 479.6 | 364 | 0.27 | 0.22 |

FIG. 14G

MACHINE LEARNING BASED METHOD AND SYSTEM FOR TRANSFORMING DATA

TECHNICAL FIELD

Generally, the invention relates to transforming data. More specifically, the invention relates to Machine Learning (ML) based method and system for transforming data organized in tabular structure.

BACKGROUND

Extraction of correct information from documents and other unstructured sources of data is essential in a lot of data processing methods and systems. These documents contain information in a variety of formats and a lot of times crucial information is present in a semi-structured format such as tables, images, graphs, and the like. Currently, many tools and techniques are available for processing such information present in the semi-structured format, especially in a tabular format. One of existing techniques to process the semi-structured information present in a tabular format corresponds to an Extract, Transform, and Load (ETL) mechanism.

The ETL mechanism uses a set of tools and techniques to extract tabular information from outside sources, transform the extracted tabular information to a usable format to fit operational needs, and load the transformed tabular information in a target database. The extraction and the loading of the tabular information can be effectively performed using the ETL mechanism. However, transforming the semi-structured tabular information into the usable format using the existing ETL mechanism may require a need for creating multiple transformations functions. Moreover, the creation of these multiple transformations functions to transform the semi-structured tabular information may be time-consuming and may require extra manual efforts.

Therefore, there is a need of implementing an efficient and reliable ML based method and system for transforming data organized in tabular structure into the usable format.

SUMMARY OF INVENTION

In one embodiment, a method for transforming data organized in tabular structure is disclosed. The method may include assigning a score to each of a plurality of cells within a table based on an associated set of orthogonal features characterizing a set of data. It should be noted that, the set of orthogonal features may comprise visual features, syntactic features, and language-based features. The method may include identifying for each of the plurality of cells a cell type based on the assigned score. The method may include determining a table type based on the cell type and the set of orthogonal features determined for each of the plurality of cells. It should be noted that, the table type may comprise one of a row-oriented table, a column-oriented table, and a composite table.

In another embodiment, a method for collating analogous data from disparate tables is disclosed. The method may include retrieving from each of the disparate tables, a unique Identifier (ID) assigned to each key cell within the disparate tables. To assign a unique ID to a key cell, the method may include matching a hash key generated for the key cell with hash keys assigned to each field name in a predefined domain schema. It should be noted that, the hash key may be generated based on language model-based mapping, and semantic and syntactic information captured from the corresponding table from the disparate tables. To assign a unique ID to a key cell, the method may include identifying the mapping field name for the key cell from the predefined domain schema based on the matching. To assign a unique ID to a key cell, the method may include assigning a unique ID to the key cell based on the determined mapping field name. It should be noted that, the unique ID may be pre-assigned to the determined mapping field name in the predefined domain schema. The method may include extracting a set of data from each of the disparate tables based on the unique ID assigned to each key cell within the disparate tables. It should be noted that, each of the set of data corresponds to a key cell and is associated with the unique ID of the key cell. The method may include populate a central database with the set of data based on the associated unique IDs. It should be noted that, the central database may be compliant with the predefined domain schema.

BRIEF DESCRIPTION OF THE FIGURES

The present application can be best understood by reference to the following description taken in conjunction with the accompanying drawing figures, in which like parts may be referred to by like numerals.

FIGS. 4A-4B represent a pre-processing view and a post-processing view of a table, in accordance with an exemplary embodiment.

FIG. 9 is an exemplary view representing a cell type identified for each of a plurality of cell type present within a table, in accordance with an exemplary embodiment.

FIGS. 14A-14G illustrate a detailed process for extracting and collating analogous data from disparate tables, in accordance with an exemplary embodiment.

DETAILED DESCRIPTION

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
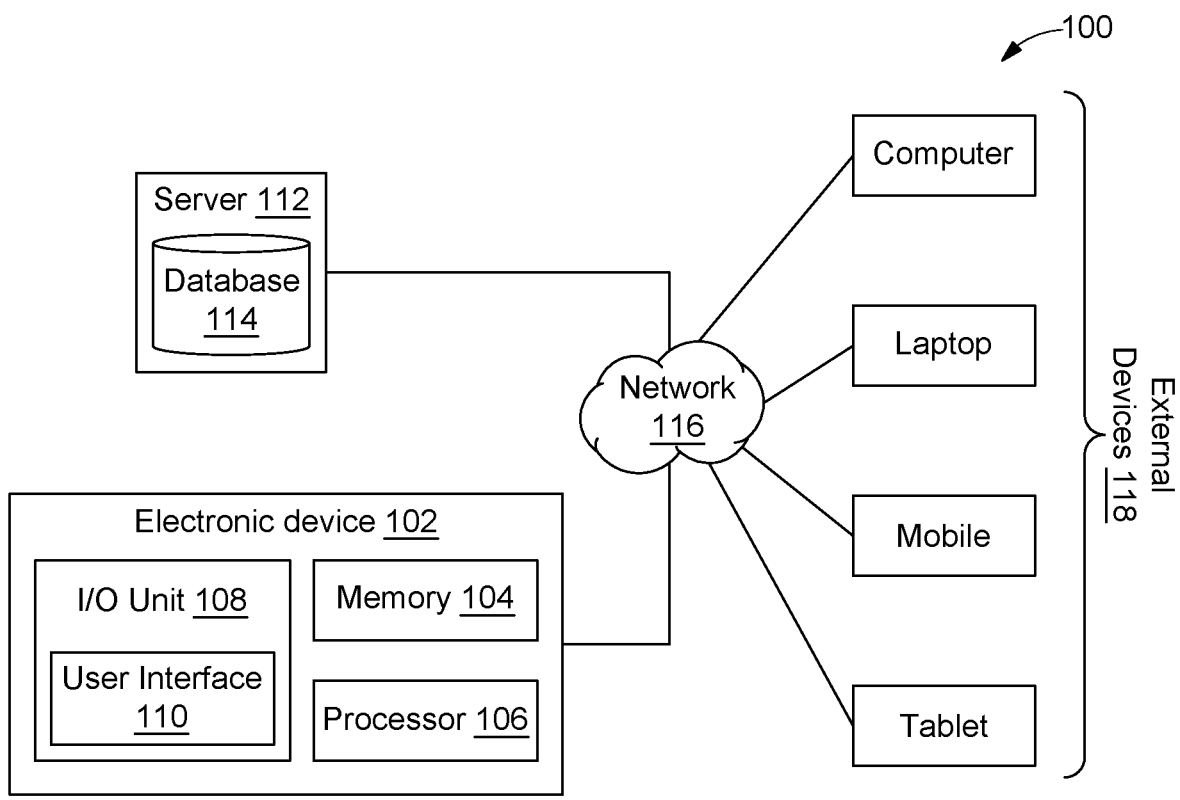
FIG. 1 illustrates a functional block diagram of a system configured to transform data organized in a tabular structure, in accordance with an embodiment.

A functional block diagram of a system 100 configured to transform data organized in a tabular structure is illustrated in FIG. 1, in accordance with an embodiment. The system 100 may be configured to transform data from a table extracted from a document. As will be appreciated the document may include one or more tables. Examples of the document may include, but are not limited to, a Portable Document Format (PDF) document, an excel-sheet, a word document, a Hyper-Text Markup Language (HTML) document, or an image document. The table may be extracted from the document using an existing table extraction technique. The system 100 may include an electronic device 102. Examples of the electronic device 102 may include, but are not limited to, a server, a desktop, a laptop, a notebook, a tablet, a smartphone, a mobile phone, an application server, or the like. To start with the electronic device 102 may be configured to unmerge one or more merged cells from a plurality of cells present within the table. Further, the electronic device 102 may be configured to normalize one or more cells based on pre-defined criteria. By way of an example, the pre-defined criteria may include, but is not limited to, removal of repeating columns or rows, removal of redundant cells, unmerging of fused cells, or a pre-defined arrangement for data present with the plurality of cells. A method of pre-processing a table is further explained in detail in conjunction with FIG. 3 and FIG. 4.

Once the table is pre-processed, the electronic device 102 may assign a score to each of a plurality of cells based on an associated set of orthogonal features that characterize a set of data. The set of orthogonal features may include visual features, syntactic features, and language-based features. In other words, the orthogonality of features may be indicative of visual features, syntactic features, and language-based features. Upon assigning the score to each of the plurality of cells, the electronic device 102 may identify a cell type of each of the plurality of cells based on the assigned score. The cell type may be one of a key cell, a value cell, or a null cell. Once the cell type is identified, the electronic device 102 may determine a table type based on the cell type and the set of orthogonal features determined for each of the plurality of cells. In an embodiment, the table type is one of a row-oriented table, a column-oriented table, or a composite table. The composite table may be a table that includes one or more sub-tables. A method of identifying the cell type and the table type is further explained in detail in conjunction with FIG. 5-FIG. 10.

The electronic device 102 may also be configured to determine a mapping field name for at least one key cell present within the table. The mapping field name for at least one key cell may be defined within a predefined domain schema. In an embodiment, the pre-defined domain schema may be created based on a set of domain artifacts. The set of domain artifacts may include, but are not limited to domain ontologies, domain associated dictionary, corpus of domain associated text, list of abbreviations, and units with associated conversions. The pre-defined domain schema, for example, may be a central database that may be structured in a specific manner using a fixed set of fields. The pre-defined domain schema may also be referred to as system of records. By way of an example, the system of records may be maintained by an organization that is collating or accumulating data from multiple vendors and these vendors provide similar data but in varied formats.

The electronic device 102 may determine the mapping field name from the pre-defined domain schema based on language model-based mapping, semantic, and syntactic information captured from the table. To determine the mapping field name for the at least one key cell, the electronic device 102 may generate a hash key associated with a key name for each key cell within the table. The hash key may be generated based on the language model-based mapping, and semantic and syntactic information captured from the table. To generate hash keys, any existing hashing algorithms or a combination thereof may be used. Further, the hash key generated for each key cell may be matched with hash keys that have already been generated for each field name in the predefined domain schema. Based on the matching, the mapping field name may be identified from the predefined domain schema for the at least one key cell in the table.

Once the mapping field name is determined, the electronic device 102 may assign a unique ID to each of the at least one key cell in the table based on the determined mapping field name. In an embodiment, the unique ID may be pre-assigned to the determined mapping field name in the predefined domain schema. In addition, the unique ID assigned to each of the at least one key cell may be used to populate data into a central database created based on the predefined domain schema. A method of assigning the unique ID is further explained in detail in conjunction with FIG. 11. Once the unique ID is assigned to the at least one key cell, then the assigned unique ID may be used to collate analogous data corresponding to the at least one key cells from disparate tables. A method for collating analogous data from the disparate tables is further explained in detail in conjunction with FIG. 12-FIG. 14. Moreover, this complete process followed by the system 100 is further explained in detail in conjunction with FIG. 2 to FIG. 14.

The electronic device 102 may further include a memory 104, a processor 106, and an Input/Output unit 108. The I/O unit 108 may further include the user interface 110. A user or an administrator may interact with the electronic device 102 and vice versa through the I/O unit 108.

The I/O unit 108 may be used to display results (i.e., the pre-processed table, the cell type identified of each of the plurality of cells, the identified table type, the assigned unique ID, a collated dataset etc.) based on actions performed by the electronic device 102, to the user. The user interface 110 may be used by the user to provide inputs to the electronic device 102. Thus, for example, in some embodiment, the electronic device 102 may ingest an input that includes one or more disparate tables to obtain the collated dataset corresponding to the one or more disparate data. Further, for example, in some embodiments, the electronic device 102 may render intermediate results (e.g., the pre-processed table, the cell type identified of each of the plurality of cells, the identified table type, the assigned unique) or final results (e.g., the collated dataset including analogous data present within the disparate tables) to the user via the user interface 110.

The memory 104 may store instructions that, when executed by the processor 106, may cause the processor 106 to process tabular content. The processor 106 may perform collation of analogous data present within the disparate tables using the assigned unique ID, in accordance with some embodiments. As will be described in greater detail in conjunction with FIG. 2 to FIG. 14, in order to perform collation of analogous data, the processor 106 in conjunction with the memory 104 may perform various functions including assigning a score to each of a plurality of cells within a table, identifying the cell type based on the assigned score, determining the table type, assigning unique IDs to key cells within tables, collating analogous data from the disparate tables, etc.

The memory 104 may also store various data (e.g., the pre-processed table, the cell type identified of each of the plurality of cells, the identified table type, the assigned unique ID, etc.) that may be captured, processed, and/or required by the electronic device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the electronic device 102 may interact with a server 112 or external devices 118 over a network 116 for sending and receiving various data. The network 116, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In an embodiment, the electronic device 102 may fetch documents comprising disparate tables from the server 112. In addition, the server 112 may provide information (i.e., the collated dataset) associated with the disparate tables to the user. The server 114 may further include a database 114. The database 114 may be the central database. The central database may be complaint with the pe-defined domain schema. By way of an example, the database 114 may store information present within the disparate tables by populating the central database with the set of data present within the disparate tables based on the associated unique IDs. The database 116 may be periodically updated based on update in the set of data present within the disparate tables. Alternatively, the electronic device 102 may receive the user input from one of the external devices 118.

Figure 2:
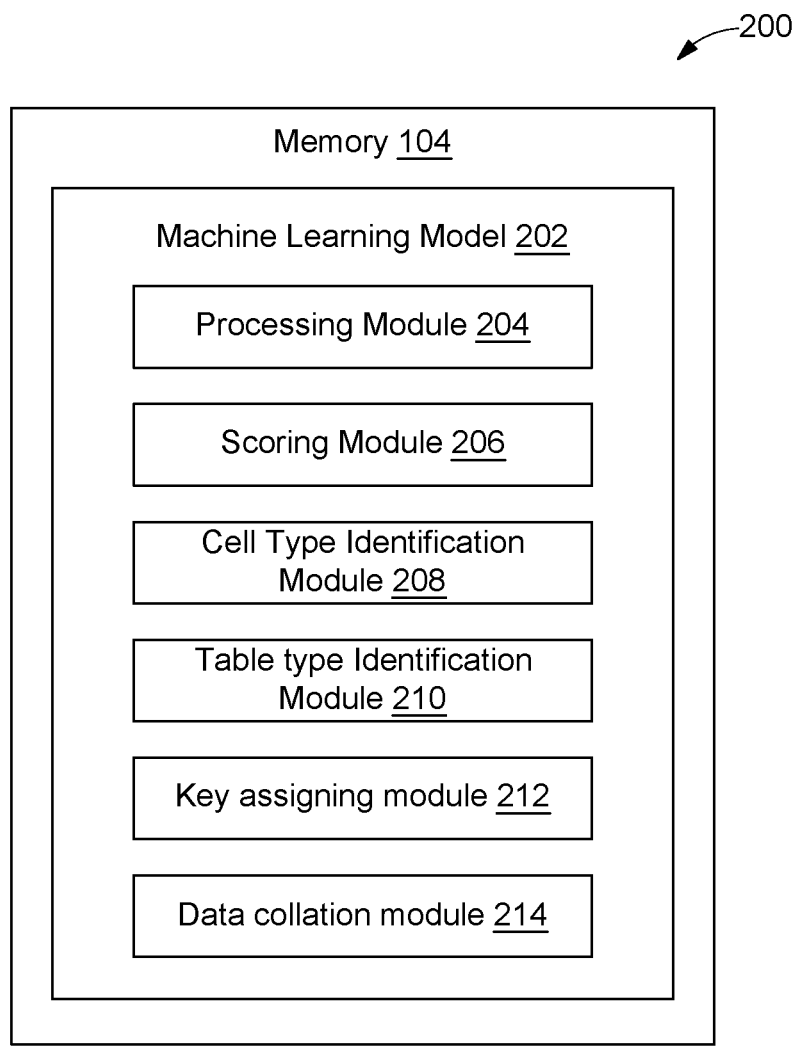
FIG. 2 illustrates a functional block diagram of various modules of a Machine Learning (ML) model stored within a memory configured to transform data organized in a tabular structure, in accordance with an embodiment.

Referring now to FIG. 2, a functional block diagram of various modules of a Machine Learning (ML) model 202 stored within in a memory 106 configured to transform data organized in tabular structure is illustrated, in accordance with some embodiment. With reference to FIG. 1, the memory 104 may include the ML model 202. To transform data organized in tabular structure, the ML model may include a processing module 204, a scoring module 206, a cell type identification module 208, a table type identification module 210, a key assignment module 212, and a data collation module 214. In some embodiments, the ML model 202 may not include the processing module 204 and the data collation module 214. The processing module 204 in such case may be an existing ML model.

The processing module 204 may be configured to pre-process a table extracted from a document. Examples of the document may include, but are not limited to, a pdf document, an excel-sheet, a word document, a Hyper-Text Markup Language (HTML) document, and an image document. In an embodiment, the table may be extracted using an existing table extraction technique. To pre-process the table, the processing module 204 may be configured to un-merge one or more merged cells from the plurality of cells present within the table. Further, the pre-processing module 204 may be configured to normalize one or more cells from the plurality of cells. The one or more cells may be normalized based on a pre-defined criteria. Examples of the pre-defined criteria may include, but are not limited to, removal of repeating columns or rows, removal of redundant cells, unmerging of fused cells, or a pre-defined arrangement for data present with the plurality of cells.

Once the table is pre-processed, the scoring module 206 may be configured to assign a score to each of the plurality of cells. The scoring module 206 may assign the score to each of the plurality of cells based on the associated set of orthogonal features. In an embodiment, the set of orthogonal features may include visual features, syntactic features, and language-based features. By way of an example, the visual features may include, but are not limited to, font size, font color, font property, cell position, cell background, row affinity, column affinity, cell term frequency, and the like. Further, the syntactic features may include data type present within each cell, i.e., alphabetical characters, numeral, special characters, and the combination thereof. In addition, the language-based features may include matching of cell data of each of the plurality of cells with the pre-defined domain schema. Based on each of the set of orthogonal features determined for a cell from the plurality of cells, the score may be assigned to the cell.

Upon assigning the score to each of the plurality of cells, the cell type identification module 208 may be configured to identify the cell type of each of the plurality of cells. The cell type may be identified based on the score assigned to each of the plurality of cells. In an embodiment, the cell type may include one of the key cell, the value cell, or the null cell. Once the score is assigned to each of the plurality of cells, then the cell type identification module 208 may classify each of the plurality of cells in one of the key cell, the value cell, or the null cell based on the identified cell type. The classification of each of the plurality of cells in one of the key cell, the value cell, or the null cell may be done using unsupervised clustering algorithm.

Upon identifying the cell type of each of the plurality of cell, the table type identification module 210 may be configured to identify the table type of the table. The table type may be identified based on the cell type and the set of orthogonal features determined for each of the plurality of cells. The table type may be one of the row-oriented table, the column-oriented table, and the composite table. The composite table may correspond to the table that includes at least one sub-table. In an embodiment, the table type identification module 210 may identify the table type by determining a coordinate point of each of the plurality of cells. Further, the table type identification module 210 may identify at least one group of key cells based on the coordinate point and the cell type determined for each of the plurality of cells. Upon identifying the at least one group of key cells, the table type of the table may be determined. Moreover, if two group of key cells are identified form the plurality of cells, then the table type of the table is determined to be a composite table.

When the table type is determined as the composite table, the table type identification module 210 may split the at least one sub-table from the composite table to create an individual table. As will be appreciated, upon splitting the at least one sub-table from the composite table, the processing module 204 may further process each of the at least one sub-table. The scoring module 206 may also assign the score to each of the plurality of cells present within each of the at least one sub-table. Further, the cell type identification module 208 may identify the cell type of the plurality of cells present within each of the at least one sub-table. In addition, the table type identification module 210 may identify the table type of each of the at least one sub-table. In other words, this process is iteratively repeated, till each unique table is identified from the composite table.

Further, upon identifying the group of key cells, the key assigning module 212 may be configured to assign a unique identifier (ID) to at least one key cell present within the plurality of cells of the table. To assign the unique identifier, the key assigning module 212 may determine a mapping field name for the at least one key cell that is defined within a predefined domain schema. In an embodiment, the mapping field name may be identified based on language model-based mapping, and semantic and syntactic information captured from the table. The pre-defined domain schema may be created based on the set of domain artifacts. The set of domain artifacts may include domain ontologies, domain associated dictionary, corpus of domain associated text, list of abbreviations, and units with associated conversions.

Once the mapping field name is determined, the key assigning module 212 may assign the unique ID to each of the at least one key cell based on the determined mapping field name. In an embodiment, the unique ID pre-assigned to the determined mapping field name may be assigned to the at least one key cell. Further, the unique ID assigned to each of the at least one key cell may be used to pull data into the central database created based on the pre-defined domain schema. Examples of the database may include, but are not limited to, an operational database, a relational database, a not only Structured Query Language (NoSQL) database, a distributed database, a centralized database, and a graph database. It should be noted that, in a similar manner the unique ID may be assigned to key cells present within multiple disparate tables. Moreover, same unique ID may be assigned to one or more key cells present within disparate tables with similar or related (semantically and/or syntactically) key name.

Once the unique ID is assigned, the data collation module 214 may be configured to collate data present within the disparate tables in the central database based on the assigned unique ID. The central database may be compliant with the predefined domain schema. In other words, the central database is structured based on the predefined domain schema. To collate data present within the disparate tables, the data collation module 214 may retrieve the unique ID assigned to each key cell present within the disparate tables from each of the disparate tables. Upon retrieving the unique ID associated with each key cell, the data collation module 214 may extract the set of data from each of the disparate tables based on the unique ID assigned to each key cell present within the disparate tables. In an embodiment, each of the set of data may correspond to a key cell and is associated with the unique ID of the key cells. Further, the data collation module 214 may be configured to populate the central database with the set of data based on the associated unique IDs.

Figure 3:
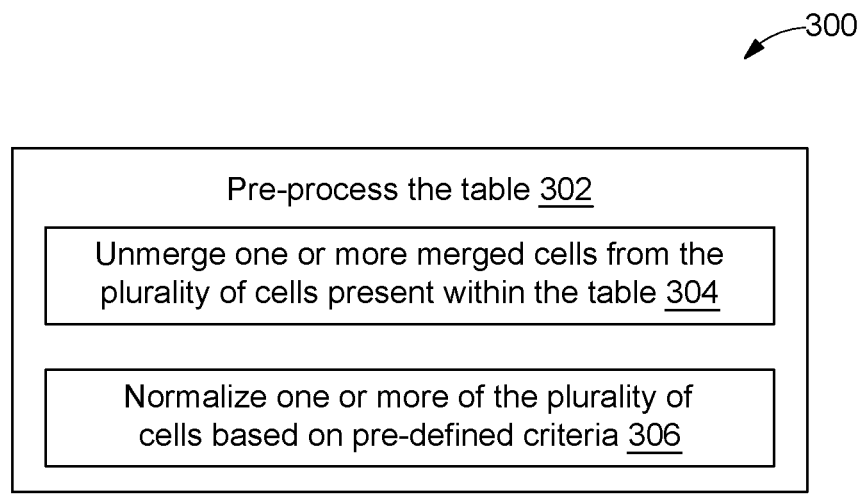
FIG. 3 illustrates a flowchart of a method for pre-preprocessing a table, in accordance with an embodiment.

Referring now to FIG. 3, a flowchart of a method 300 for pre-processing a table is illustrated, in accordance with an embodiment. Initially, at step 302, the table may be pre-processed. It should be noted that, the table may be extracted from the document using the existing table extraction technique. To pre-process the table as mentioned via the step 302, at step 304, one or more merged cells may be unmerged from the plurality of cells present within the table. Once the one or more merged cells are unmerged, at step 306, one or more of the plurality of cells may be normalized. The one or more cells may be normalized based on the pre-defined criteria. In an embodiment, the normalizing of the one or more of the plurality of cells is done to efficiently arrange data present with one or more of the plurality of cells. In other words, the normalizing of the one or more cells may be done to structure data in an organized way by reducing data redundancy and increasing data integrity. Example of the pre-defined criteria may include, but is not limited to, removal of repeating columns or rows, removal of redundant cells, unmerging of fused cells, or a pre-defined arrangement for data present with the plurality of cells.

Referring now to FIGS. 4A-4B, a table representing a pre-processing view and a post-processing view of a table, in accordance with an exemplary embodiment. FIG. 4A and FIG. 4B are explained in conjunction with FIG. 3. A table 400A extracted from a document is represented via FIG. 4A. In other words, the table 400A may correspond to a raw table extract that is extracted from the document. In other words, the table 400A is the pre-processing view. The table 400A may be processed to unmerge the one or more merged cell from the plurality of cells and normalize the one or more cells from the plurality of cells present within the table 400A. During pre-processing of the table 400A, a merged cell 'Table A: DC133_XX01' may be unmerged based on a data processing technique by an ML model. Once the merged cell 'Table A: DC133_XX01' is unmerged, the cell 'Table A: DC133_XX01' may be normalized based on the pre-defined criteria. A result of the processing the table 400A is represented via a table 400B of FIG. 4B, which is the post-processing view. As represented via the table 400B, the merged cell 'Table A: DC133_XX01' may be unmerged and normalized to arrange data present within the plurality of cells in a structured way.

Figure 5:
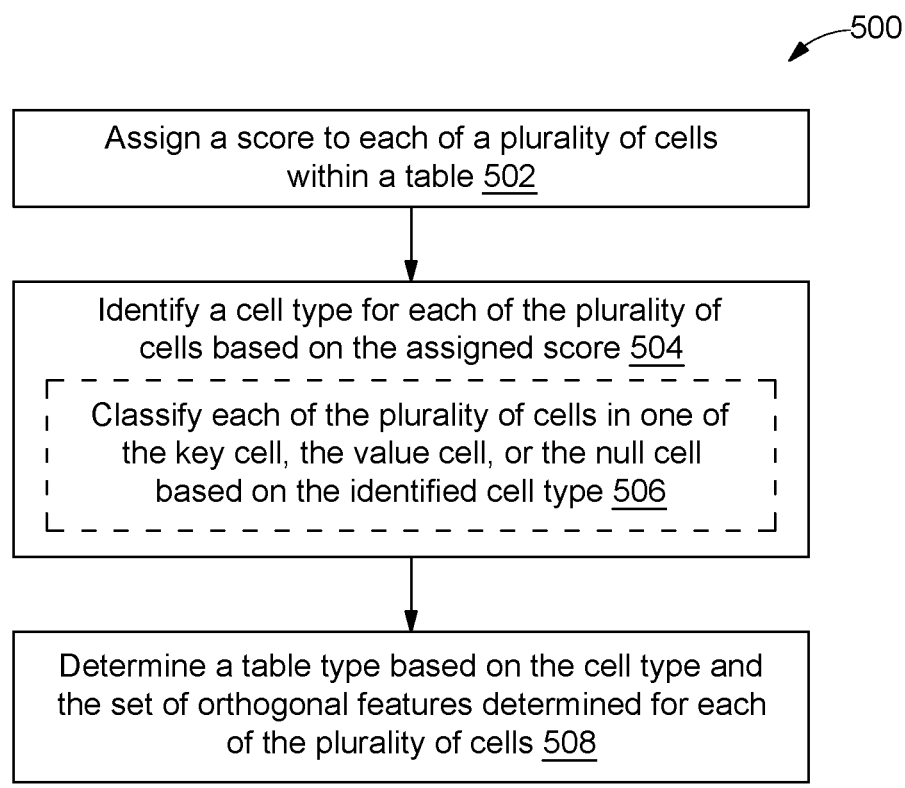
FIG. 5 illustrates a flowchart of a method for transforming data organized in a tabular structure, in accordance with an embodiment.

Referring now to FIG. 5, a flowchart of a method 500 for transforming data organized in tabular structure is illustrated, in accordance with an embodiment. To process content within a table, at step 502, a score may be assigned to each of a plurality of cells within the table. In an embodiment, the score may be assigned based on an associated set of orthogonal features. In an embodiment, the set of orthogonal features may include visual features, syntactic features, and language-based features. Examples of the visual features may include, but are not limited to, font size, font color, font property, cell position, cell background, row affinity, column affinity, cell term frequency, and the like. Examples of the syntactic features may include data type present within each cell, i.e., alphabetical characters, numerals, special characters, and the combination thereof. In addition, the language-based features may include matching of cell data of each of the plurality of cells with the pre-defined domain schema. It should be noted that, to perform language-based matching of terms, an ML model (same as the ML model 204) may be fined-tuned based on an associated domain. In an embodiment, the domain may be specific to an industry, a discipline, or an activity. To assign the score to each cell, each cell may be evaluated based on its associated visual features, syntactic features, and language-based features.

Once the score is assigned to each of the plurality of cells, at step 504, a cell type may be identified for each of the plurality of cells based on the assigned score. In an embodiment, the cell type may be one of a key cell, a value cell, or a null cell. By way of an example, the cell type for a cell from the plurality of cells with visual feature 'font property: bold', syntactic feature 'cell data: alphabetical characters', and language-based feature 'matching cell term present within the pre-defined domain schema' may be identified to be the key cell. By way of another example, the cell type for a cell from the plurality of cells with visual feature 'font property: arial', syntactic feature 'cell data: numeral with special character %' may be identified to be the value cell. Based on the identified cell type, at step 506, each of the plurality of cells may be classified in one of the key cell, the value cell, or the null cell.

Further, at step 508, a table type may be determined for the table. The table type may be determined based on the cell type and the set of orthogonal features determined for each of the plurality of cells. In an embodiment, the table type may include one of a row-oriented table, a column-oriented table, and a composite table. A method of identifying the table type is further explained in detail in conjunction with FIG. 6 and FIG. 7. In an embodiment, the composite table may correspond to a table comprising at least one sub-table. Upon identifying the table type as the composite table type, each sub-table present within the composite table may be split to create an individual table corresponding to each sub-table. This has been further explained in detail in conjunction with FIG. 8.

Figure 6:
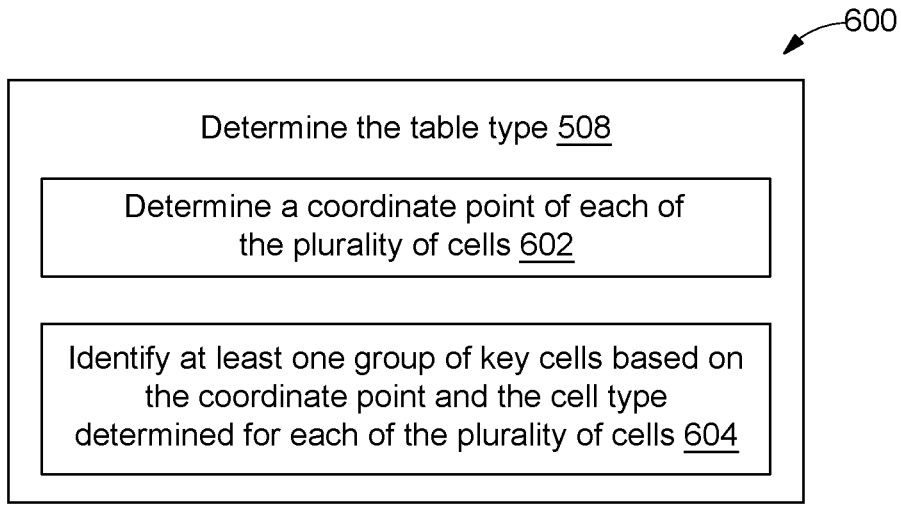
FIG. 6 illustrates a flowchart of a method of identifying a table type of a table, in accordance with an embodiment.

Referring now to FIG. 6, a flowchart of a method 600 of identifying a table type of a table is illustrated, in accordance with an embodiment. With reference to FIG. 5, to determine the table type as mentioned via the step 508, at step 602, a coordinate point of each of the plurality of cells may be determined. Once the coordinate point of each of the plurality of cells is determined, at step 604, at least one group of key cells may be identified from the plurality of cells present within the table. The at least one group of key cells may be identified based on the coordinate point and the cell type determined for each of the plurality of cells. Upon identifying the at least one of at least one group of key cells based on the coordinate point and the cell type, the table type may be determined to be one of the row-oriented table, the column-oriented table, or the composite table.

As will be appreciated, in case of the row-oriented table and the column-oriented table only one group of key cells may be identified. However, when more than one group of key cells (for example: two group of key cells) are identified in the plurality of cells present within the table, then the table type for the table may be determined as the composite table. Upon identifying the table type to be composite table, each sub-table present within the composite may be split to create the individual table. By way of an example, in case of two group of key cells, there may be two tables merged together. Upon identifying two merged tables, each table of the two merged tables may be split to create the individual table. This is further explained in detail in conjunction with FIG. 8.

Figure 7:
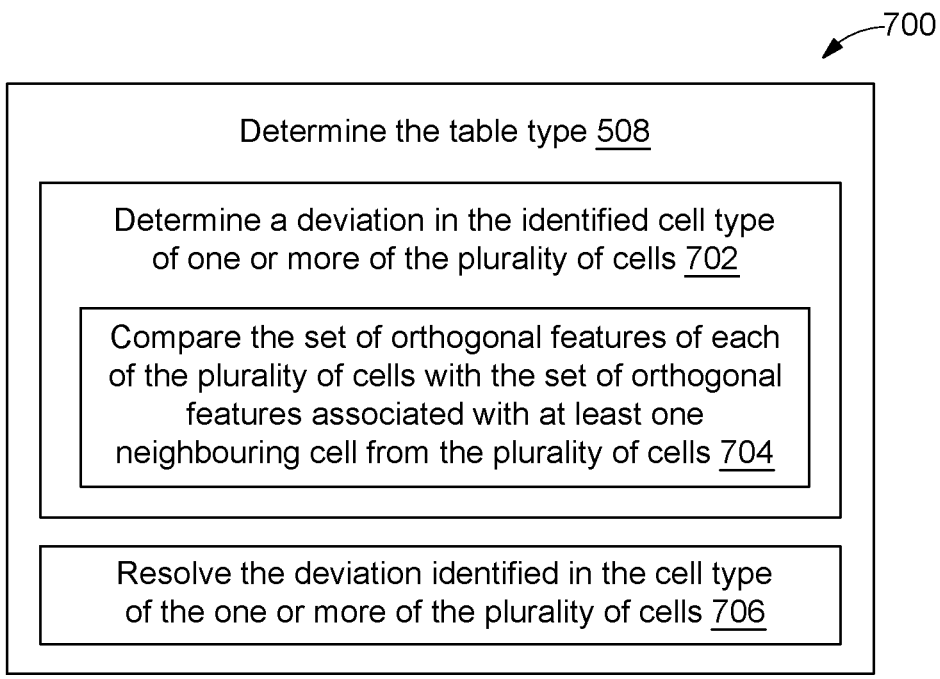
FIG. 7 illustrates a flowchart of a method of identifying a table type of a table, in accordance with another embodiment.

Referring now to FIG. 7, a flowchart of a method 700 for identifying a table type of a table is illustrated, in accordance with an embodiment. is illustrated, in accordance with an embodiment. With reference to FIG. 5, to identify the table as mentioned via the step 508, at step 702, a deviation may be determined in the identified cell type of one or more of the plurality of cells. The deviation may be determined by performing a rule-based neighborhood analysis. To perform the rule-based neighborhood analysis for each of the plurality of cells, at step 704, the set of orthogonal features of each of the plurality of cells may be compared with the set of orthogonal features associated with at least one neighboring cell from the plurality of cells.

Based on comparison of the set of orthogonal features of the each of the plurality of cells with the set of orthogonal features associated with at least one neighboring cell, the deviation may be identified in the cell type of one or more of the plurality of cells. Upon identifying the deviation, at step 706, the deviation in the identified cell type may be resolved. By way of an example, suppose the cell type identified for a cell is marked as a key cell which is surrounded by four neighboring cells each marked with the cell type as a value cell. Then, the cell marked as the key cell may correspond to the deviation that may be resolved using the rule-based neighborhood analysis. To resolve the cell type of cell marked as the key cell, the set of orthogonal features associated with the key cell may be compared with the set of orthogonal features associated with each of the four neighboring cells marked as the value cell. Based on the comparison, the cell type marked for the cell as the key cell may be changed to the value cell.

Figure 8:
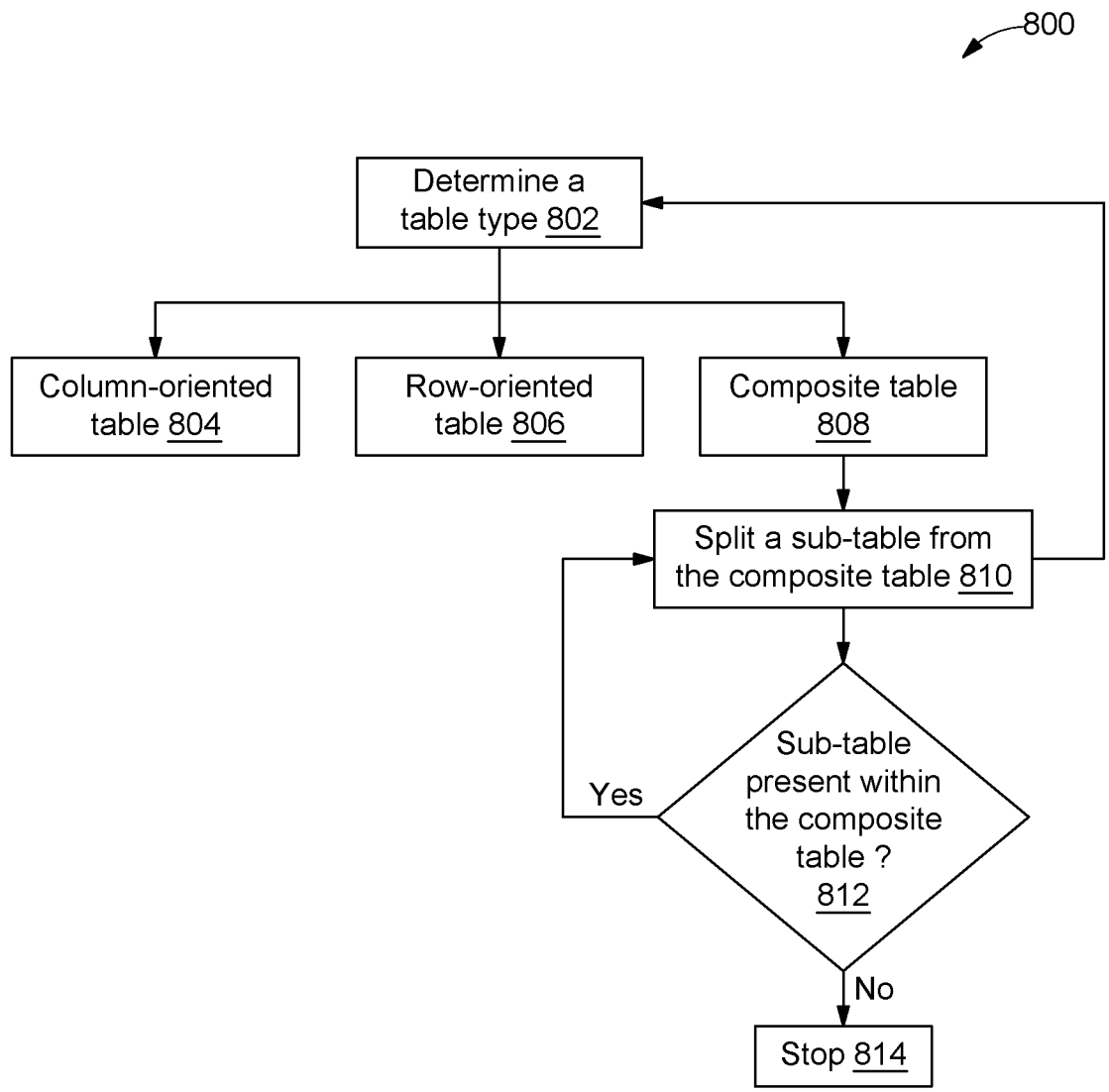
FIG. 8 illustrates a flowchart of a method for extracting at least one sub-table from a composite table, in accordance with an embodiment.

Referring now to FIG. 8, a flowchart of a method 800 of extracting at least one sub-table from a composite table is illustrated, in accordance with an embodiment. Initially, at step 802, the table type may be determined for the table. In an embodiment, the table type may be determined based on the cell type and the set of orthogonal features determined for each of the plurality of cells. In an embodiment, the table type may include one of a row-oriented table 804, a column-oriented table 806, and a composite table 808. The method of identifying the table type has been already explained in reference to FIG. 6 and FIG. 7. In an embodiment, the composite table may correspond to the table that includes at least one sub-table.

Upon identifying the table type to be the composite table as mentioned via the step 808, at step 810, a sub-table may be split from the composite table. In one embodiment, once the sub-table is split from the composite table, the step 802 may be re-executed to identify the table type of each of the sub-table. In order to identify the table type of the sub-table, the sub-table may be pre-processed. Further, the score may be assigned to each of a plurality of cells present within the sub-table based on an associated set of orthogonal features. Based on the assigned score, the cell type may be identified for each of the plurality of cells present within the sub-table. Further, based on the determined cell type and the set of orthogonal features determined for each of the plurality of cells, the table type of the sub-table may be determined.

In another embodiment, once the sub-table is split from the composite table, at step 812, a check may be performed to identify whether a second sub-table is present within the composite table. Further, in first case, based on the check performed upon identifying the second sub-table within the composite table, the step 810 may be re-executed. Once the second sub-table present within the composite is split, the step 802 may be re-executed. In second case, based on the check performed, when the second sub-table is not identified within the composite table, the method 800 may stop as mentioned via step 814.

Referring now to FIG. 9, an exemplary view 900 generated based on a cell type identified for each of a plurality of cell type present within a table is represented, in accordance with an exemplary embodiment. FIG. 9 is explained in reference to FIG. 4B. Once the table is pre-processed and each of the plurality of cells are normalized as depicted via the table 400B, the score may be assigned to each of the plurality of cells based on the associated set of orthogonal features. The method of assigning the score has been already explained in reference to FIG. 5. Once the score is assigned to each of the plurality of cells, the cell type may be identified for each of the plurality of cells based on the assigned score. In an embodiment, the cell type may be one of the key cell, the value cell, or the null cell. The method of identifying the cell type has been already explained in reference to FIG. 5. In reference to FIG. 4B, the cell type identified for each of the plurality of cells present with the table 400B may be represented as depicted via the table 900.

In the table 900, each cell identified as the key cell from the plurality of cells is depicted as 'KEY'. Further, each cell identified as the value cell from the plurality of cells is depicted as 'VALUE'. In addition, each cell identified as the null cell from the plurality of cells is depicted as 'NULL'. In an embodiment, during the identification of the cell type, the cell type identified for one or more cells from the plurality of cells may be incorrect, due to inaccuracy in assigning the score to the one or more cells based on the associated set of orthogonal features. As depicted via the table 900, the cell type for two cells represented via a dash line may be incorrect. This inaccuracy in the cell type identified for the two cells may be resolved while determining the table type for the table.

Figure 10:
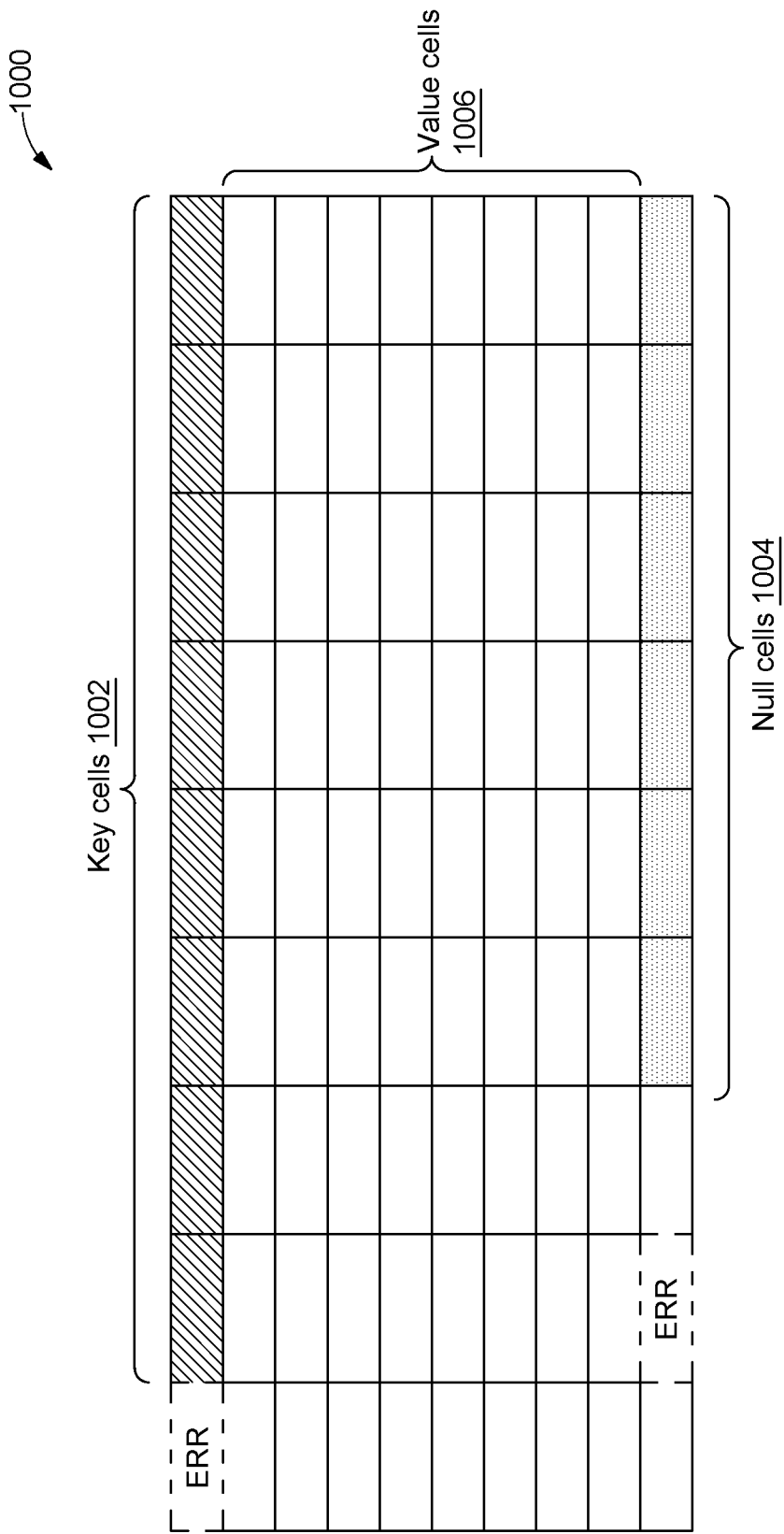
FIG. 10 is an exemplary view representing a table type identified for a table, in accordance with an exemplary embodiment.

Referring now to FIG. 10, an exemplary view 1000 generated based on a determined table type is represented, in accordance with an exemplary embodiment. FIG. 10 is explained in reference to FIG. 9. Upon identifying the cell type of each of the plurality of cells, the table type may be determined. The table type of the table 1000 may be determined based on the cell type and the set of orthogonal features determined for each of the plurality of cells. In an embodiment, the table type may be one of the row-oriented table, the column-oriented table, and the composite table. The method of determining the table type is already explained in detail in reference to FIG. 6 to FIG. 8. During the determination of the table type, any error (i.e., the deviation) occurred in the cell type determined for one or more cells from the plurality of cells may be resolved. Further, the deviation identified in the cell type of the one or more cells may be resolved based on the rule-based neighborhood analysis. The method of resolving the deviation has been already explained in detail in reference to FIG. 8.

Further, to identify the table type, the at least one group of key cells may be identified from the plurality of cells. In an embodiment, the at least one group of key cells may be identified based on the coordinate point and the cell type determined for each of the plurality of cells. In the table 1000, each key cell from the at least one group of key cells is depicted via a highlighted portion labelled as key cells 1002. Further, each null cell identified from the plurality of cells is depicted via a highlighted portion as null cells 1004. In addition, each value cell identified from the plurality of cells is depicted without any highlight and is labelled as value cells 1006.

Based on the rule-based neighborhood analysis, upon identifying the deviation in the one or more cells from the plurality of cells, the one or more cells may be marked as a 'ERR' (error). In an embodiment, the deviation may depict difference in the cell type identified for the one or more cells based on the assigned score and the cell type identified while determining the table type based on the rule-based neighborhood analysis. With reference to FIG. 9, the cell type identified for two cells represented via the dash line was determined to be incorrect upon identifying the deviation in the cell type identified for the two cells based on the assigned score and the cell type identified for same two cells based on the rule-based neighborhood analysis while determining the table type. As represented via the table 1000, the deviation identified in the cell type of the two cells are marked as a "ERR". Further, this identified deviation may be resolved based on the cell type determined for the two cells while determining the table type using the rule-based neighborhood analysis. Further, as depicted via the table 1000, upon identifying the at least one group of key cells, i.e., the key cells 1002, the table type for the table may be determined as the row-oriented table.

Figure 11:
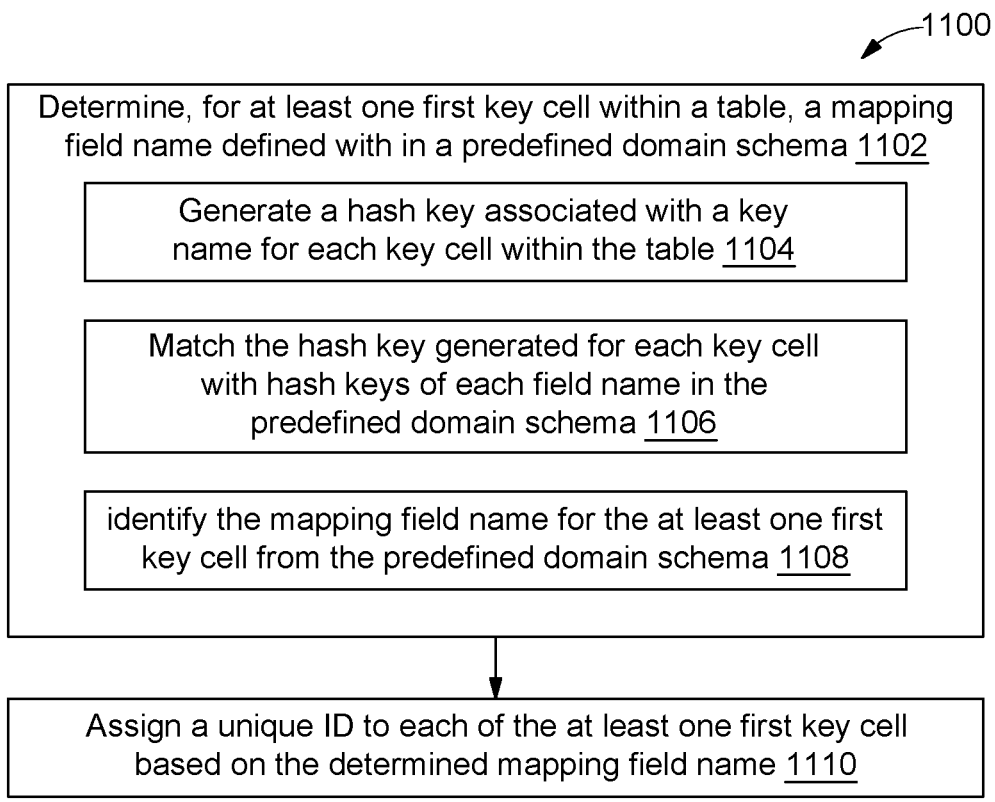
FIG. 11 illustrates a flowchart of a method for assigning unique Identifiers (IDs) to key cells within tables, in accordance with an embodiment.

Referring now to FIG. 11, a flowchart of a method 1100 for assigning unique Identifiers (IDs) to key cells within tables is illustrated, in accordance with an embodiment. To assign the unique IDs to key cells, initially at step 1102, a mapping field name may be determined for at least one key cell within a table. In an embodiment, the mapping field name for the at least one key cell may be defined within the pre-defined domain schema. In an embodiment, the pre-defined domain schema may be created based on a set of domain artifacts. The set of domain artifacts may include domain ontologies, domain associated dictionary, corpus of domain associated text, list of abbreviations, and units with associated conversions.

Further, the mapping field name for the at least one key cell may be determined based on language model-based mapping, and semantic and syntactic information captured from the table. To identify the mapping field name defined within the pre-defined domain schema, at step 1104, a hash key may be generated for each key cell. In an embodiment, the generated hash key may be associated with a key name for each key cell present within the table. Moreover, the hash key may be generated based on the language model-based mapping, and semantic and syntactic information captured from the table. By way of an example, in order to generate the hash key, a cell data representing semantic information of a key cell with a key name, e.g., "Acc ID" may be analyzed based on the language model-based mapping. Further, a cell data representing syntactic information of each value cell associated with the key cell, "Acc ID", e.g., '2355110011236789' '5896123400007878', '7890345612345678', and the like, may be analyzed based on the language model-based mapping. Based on the analysis of the cell data of the key cell and the cell data of each value cell associated with the key cell, the hash key may be generated.

Once the hash key is generated for each key cell, at step 1106, the hash key generated for each key cell may be matched with hash keys of each field name in the pre-defined domain schema. Further, at step 1108, the mapping field name for the at least one key cell may be identified from the predefined domain schema based on the matching. In continuation to previous example, suppose the hash key generated for the key cell with the key name, e.g., "Acc ID" may be matched with hash key of each field name present with a pre-defined domain schema created based on a set of domain artifacts associated with banking Industry (i.e., a specific domain). Now suppose the hash key generated for the key cell with the key name "Acc ID" matches with the hash key associated with a field name "Account ID" present within the pre-defined domain schema created for the banking industry. Then, based on matching, the mapping field name determined for the key cell with the key name "Acc ID" from the pre-defined domain schema may correspond to the "Account ID".

Upon determining the mapping field name defined for each of the at least one key cell in the pre-defined domain schema, at step 1110, a unique ID may be assigned to each of the at least one key cell based on the determined mapping field name. In an embodiment, the unique ID may be pre-assigned to the determined mapping field name in the pre-defined domain schema. By way of an example, once the mapping field name "Account ID" is determined for the key cell with the key name "Acc ID", then a unique ID (e.g., #AF28) pre-assigned to the mapping field name "Account ID" in the pre-defined domain schema may be assigned to the key cell with the key name "Acc ID". Once the unique ID is assigned to each of the at least one key cell, the assigned unique ID may be used to populate data into the central database created based on the predefined domain schema. A method for populating the central database has been further explained in detail in conjunction with FIG. 12-FIG. 14.

Figure 12:
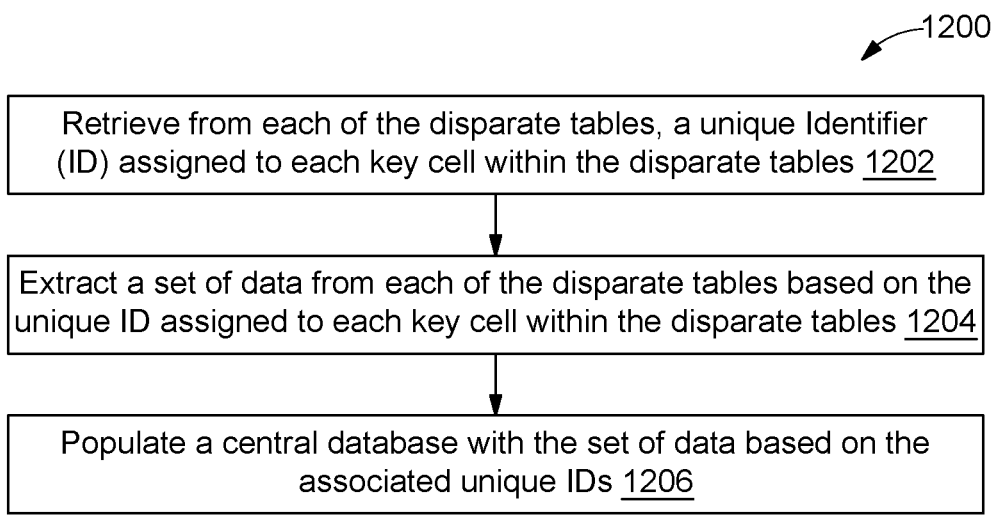
FIG. 12 illustrates a flowchart of a method of collating analogous data from disparate tables in a central database, in accordance with an embodiment.

Referring now to FIG. 12, a flowchart of a method 1200 of collating analogous data from disparate tables in a central database is illustrated, in accordance with an embodiment. In an embodiment, each of the disparate tables may correspond to a table that includes a set of data corresponding to each key cell in a format that differs from other disparate tables. Moreover, each of the disparate tables may belong to one specific domain. In order to collate data present within the disparate tables, at step 1202, from each of the disparate tables, a unique Identifier (ID) assigned to each key cell present within the disparate tables may be retrieved. A method of assigning the unique ID to each key cell present within tables has been already explained in detail in reference to FIG. 11. Upon retrieving the unique ID assigned to each key cell present within the disparate tables, at step 1204, the set of data may be extracted from each of the disparate tables based on the unique ID assigned to each key cell within the disparate tables. In an embodiment, each of the set of data may correspond to a key cell and may be associated with the unique ID of the key cells. Once the set of data associated with each key cell is retrieved from each of the disparate tables, then at step 1206, the central database may be populated based on the unique ID associated with each key cell. In an embodiment, the central database may be compliant with the predefined domain schema (i.e., the specific domain). The method of collating analogous data from disparate tables has been further explained in detail via an exemplary embodiment in reference to FIG. 14.

Figure 13:
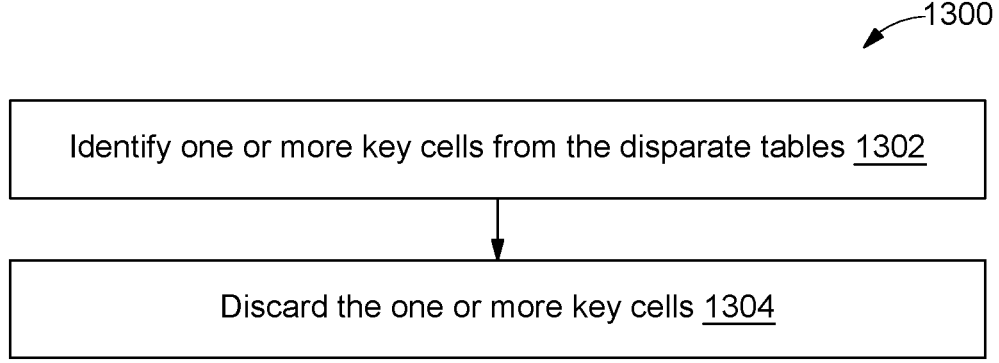
FIG. 13 illustrates a flowchart of a method of discarding one or more key cells from key cells present within disparate tables, in accordance with an embodiment.

Referring now to FIG. 13, a flowchart of a method 1300 of discarding one or more key cells from key cells present within disparate tables is illustrated, in accordance with an embodiment. In reference to FIG. 12, while retrieving the unique ID assigned to each key cell present within the disparate tables as mentioned via the step 1202, at step 1302, one or more key cells from the disparate tables may be identified. In an embodiment, the hash key generated for the one or more key cells may fail to match with hash keys of field names in the predefined domain schema. In other words, the hash key generated for the one or more key cells identified from the disparate tables may not match with hash keys of field names present within the predefined domain schema. Upon not identifying any match of the hash key generated for the one or more key cells with the hash key of the field names in the pre-defined domain schema, at step 1302, the one or more key cells and associated values may be discarded. This is further explained in detail in reference to FIGS. 14A-14G.

Referring now to FIG. 14A-14G, a detailed processes for extracting and collating analogous data from disparate tables is illustrated, in accordance with an exemplary embodiment. In the exemplary embodiment, two disparate tables, i.e., a table 1400A and a table 1400B including analogous data is depicted via a FIG. 14A and FIG. 14B. The table 1400A and the table 1400B may be associated with an oil and gas industry domain. The analogous data depicted via the table 1400A and the table 1400B is raw table extract and includes information related to oil wells and values of various associated parameters. The data in the disparate tales is analogous since the data in both these table is related to same parameters for oil wells; however, these are represented in a different manner.

In order collate data present within the table 1400A and the table 1400B in a central database associated with a pre-defined domain schema, initially, the table 1400A and the table 1400B may be pre-processed. Further, in order to pre-process the table 1400A and the table 1400B, one or more of a plurality of cells present with the table 1400A and the table 1400B may be unmerged. Further, one or more cells from the plurality of cells within the table 1400A and the table 1400B may be normalized based on the pre-defined criteria. The method of pe-processing the table has been already explained in detail in reference to FIG. 3.

Once the table 1400A and the table 1400B are pre-processed, the table 1400A and the table 1400B may be transformed using an ML model to identify a cell type of each of the plurality of cells present within the table 1400A and table 1400B and to determine the table type of the table 1400A and table 1400B. With reference to FIG. 2, the ML model may correspond to the ML model 202. To identify the cell type of each of the plurality of cells present with the table 1400A and the table 1400B, a score may be assigned to each of the plurality of cells based on the set of orthogonal features associated with each of the plurality of cells. The set of orthogonal features may include visual features, syntactic features, and language-based features. Further, based on the assigned score, the cell type for each of the plurality of cells present within the table 1400A and the table 1400B may be identified using the ML model. Upon identifying the cell type, the table type of each of the table 1400A and the table 1400B may be identified. In an embodiment, the table type may include one of the row-oriented table, the column-oriented table, and the composite tables.

To identify the table type of the table 1400A and the table 1400B, a coordinate point of each of the plurality of cells may be identified. Once the coordinate point and the cell type of each of the plurality of cells present within the table 1400A and the table 1400B is identified, then at least one group of key cells may be identified within the table 1400A and the table 1400B. Based on the at least one group of key cells identified within the table 1400A and the table 1400B, the table type of the table 1400A and the table 1400B may be determined. As depicted via the FIG. 14A, the table 1400A may be determined to be a row-oriented table based on a group of key cells identified within the table 1400A as depicted via a highlighted portion in the FIG. 14A. In the table 1400A, each key cell present within the table 1400A may include 'Table A', 'Reservoir', 'Net Sand', 'Net Pay', 'Vsh', 'Phie', 'Swe', 'Oil Perm', 'Kh (md-ft)'. In addition, as depicted via the FIG. 14B, the table 1400B may be determined to be a column-oriented table based on a group of key cells identified within the table 1400B as depicted via a highlighted portion in the FIG. 14B. Further, in the table 1400B, each key cell present within the table 1400B may include 'Table B', 'Interval', 'Gross Length (m)', 'Net Length (m)', 'Net to gross', 'Average net porosity (mD)', 'Average arithmetic net permeability (mD)', 'Average water saturation'. The method for identifying the cell type of each of the plurality of cells and the table type for the table has been already explained in detail in reference to FIG. 5 to FIG. 10.

Once the group of key cells present within the table 1400A and the table 1400B are identified as depicted via the table 1400A and the table 1400B, a unique ID may be assigned to each key cell of the group of key cells present within the table 1400A and the table 1400B. In an embodiment, the unique ID may be assigned to each key cell present within the table 1400A and the table 1400B by generating a hash key associated with a key name of each key cell. In an embodiment, the hash key may be generated based on the language model-based mapping, and semantic and syntactic information captured corresponding to the table 1400A and the table 1400B. By way of an example, in order to generate the hash key, for a key cell 'Phie' present within the table 1400A, a cell data representing semantic information of the key cell 'Phie' may be analyzed based on the language model-based mapping. Further, a cell data representing syntactic information of each value cell associated with the key cell, 'Phie', e.g., '34.5%', '30.9%', '29.9%' and the like, may be analyzed based on the language model-based mapping. Based on the analysis of the cell data of the key cell and the cell data of each value cell associated with the key cell, the hash key may be generated. In a similar manner, the hash key may be generated for a key cell 'Average net porosity (mD)' present within the table 1400B.

Upon generating the hash key, the generated hash key may be matched with hash keys assigned to field names in a pre-defined domain schema. In present embodiment, the predefined domain schema may be created based on the oil and gas industry domain. In an embodiment, the pre-defined domain schema may be created based on a set of domain artifacts associated with the oil and gas industry. In addition, the set of domain artifacts may include domain ontologies, domain associated dictionary, corpus of domain associated text, list of abbreviations, and units with associated conversions. The pre-defined domain schema created based on the oil and gas industry domain may correspond to a system of record 1402C as depicted via a table 1400C of FIG. 14C. In addition, the field name within the pre-defined domain schema, i.e., the system of records 1402C may correspond to 'well name' 'reservoir', 'net sand', 'net pay', 'porosity', and 'water saturation'.

As depicted via a table 1400D of FIG. 14D, the hash key generated for the key cells (i.e., key cells 1402A) of the table 1400A, i.e., 'Reservoir', 'Net Sand', 'Net Pay', 'Vsh', 'Phie', 'Swe', 'Oil Perm', 'Kh (md-ft) may be matched with the hash keys of the system of records 1402C, i.e., 'well name', 'reservoir', 'net sand', 'net pay', 'porosity', and 'water saturation'. Based on matching of the hash keys, the mapping field name corresponding to key cells, i.e., "Reservoir', 'Net Sand', 'Net Pay', 'Phie', 'Swe' of the key cells 1402A may be identified. In addition, one or more key cells, i.e., 'Vsh', 'Oil Perm', 'Kh (md-ft)' of the key cells 1402A, may be discarded, upon failure in identification of the mapping field name from the system of record 1402C based on matching of the hash key generated for the key cells 'Vsh', 'Oil Perm', 'Kh (md-ft)' with the hash keys of the field name in the system of records 1402C. In present FIG. 14D, as depicted via the table 1400D, each of the one or more discarded key cells, i.e., 'Table', 'Swe', 'Oil Perm', 'Kh (md-ft)' may be marked as an 'ERROR'.

Similarly, a mapping field name may be identified for the key cells (i.e., key cell 1402B) of the table 1400B. As depicted via a table 1400E of FIG. 14E, the hash key generated for the key cells 1402B, i.e., 'Interval', 'Gross Length (m)', 'Net Length (m)', 'Net to gross', 'Average net porosity (mD)', 'Average arithmetic net permeability (mD)', 'Average water saturation', may be matched with the hash keys of the system of records 1402C, i.e., 'well name', 'reservoir', 'net sand', 'net pay', 'porosity', and 'water saturation'. Based on matching of the hash keys, the mapping field name corresponding to key cells, i.e., 'Interval', 'Gross Length (m)', 'Net Length (m)', 'Average net porosity (mD)', 'Average water saturation' of the key cells 1402B may be identified. In addition, key cells, i.e., 'Net to gross', 'Average arithmetic net permeability (mD)' of the key cells 1402B may be discarded, upon failure in identification of the mapping field name from the system of record 1402C based on matching of the hash key generated for the key cells 'Net to gross', 'Average arithmetic net permeability (mD)' with the hash keys of the field name in the system of records 1402C. In present FIG. 14E as depicted via the table 1400E, each of the one or more discarded key cells, i.e., 'Net to gross', 'Average arithmetic net permeability (mD)' may be marked as an 'ERROR'.

Once the mapping field name associated with each of the one or more key cells of the key cells 1402A and the key cells 1402B is retrieved, the unique ID pre-assigned to the mapping field name may be assigned to a corresponding key cell of the key cells 1402A and a corresponding key cell of the key cells 1402B. This is depicted via a table 1400F of FIG. 14F. As depicted via the table 1400F, a unique ID 1402F pre-assigned to the field names 'reservoir', 'net sand', 'net pay', 'porosity', and 'water saturation' may correspond to '#FDEF', '#BBBB', '#CDCE', '#FDEC', and 'FDAB', respectively. The unique ID pre-assigned to each of the field names may be assigned to the corresponding key cell of the key cells 1402A, i.e., 'Reservoir', 'Net Sand', 'Net Pay', 'Phie', 'Swe', respectively. In other words, the unique ID '#FDEF', '#BBBB', '#CDCE', '#FDEC', and 'FDAB' pre-assigned to 'reservoir', 'net sand', 'net pay', 'porosity', and 'water saturation' may be assigned to 'Reservoir', 'Net Sand', 'Net Pay', 'Phie', 'Swe', respectively.

In a similar manner, the unique ID 1402F pre-assigned to each of the field names may be assigned to a corresponding key cell from the key cells 1402B, i.e., 'Interval', 'Gross Length (m)', 'Net Length (m)', 'Average net porosity (mD)', 'Average water saturation'. In other words, the unique ID 1402F, i.e., '#FDEF', '#BBBB', '#CDCE', '#FDEC', and 'FDAB' pre-assigned to 'reservoir', 'net sand', 'net pay', 'porosity', and 'water saturation' may be assigned to 'Interval', 'Gross Length (m)', 'Net Length (m)', 'Average net porosity (mD)', 'Average water saturation', respectively. Once the unique ID is assigned to each key cell present within the table 1400A and the table 1400B, the assigned unique ID may be retrieved to collate the set of data present within the table 1400A and the table 1400B.

To collate the set of data present within the table 1400A and the table 1400B in the central database, initially, the unique ID assigned to each key cell present within the table 1400A and the table 1400B may be retrieved. Further, upon retrieving the unique ID assigned to the one or more key cells of the key cells 1402A and the unique ID assigned to the one or more key cells of the key cells 1402B, the set of data may be extracted from each of the table 1400A and the table 1400B based on the unique ID assigned to each of the one or more key cells. In an embodiment, the set of data corresponds to a key cell and is associated with the unique ID of the key cells. Once the set of data corresponding to each of the one or more key cells of the table 1400A and the table 1400B is extracted, then, the central database may be populated with the set of data based on the associated unique IDs, as depicted via a table 1400G of FIG. 14G. In an embodiment, the central database may be compliant with the predefined domain schema, i.e., the oil and gas industry domain.

Figure 15:
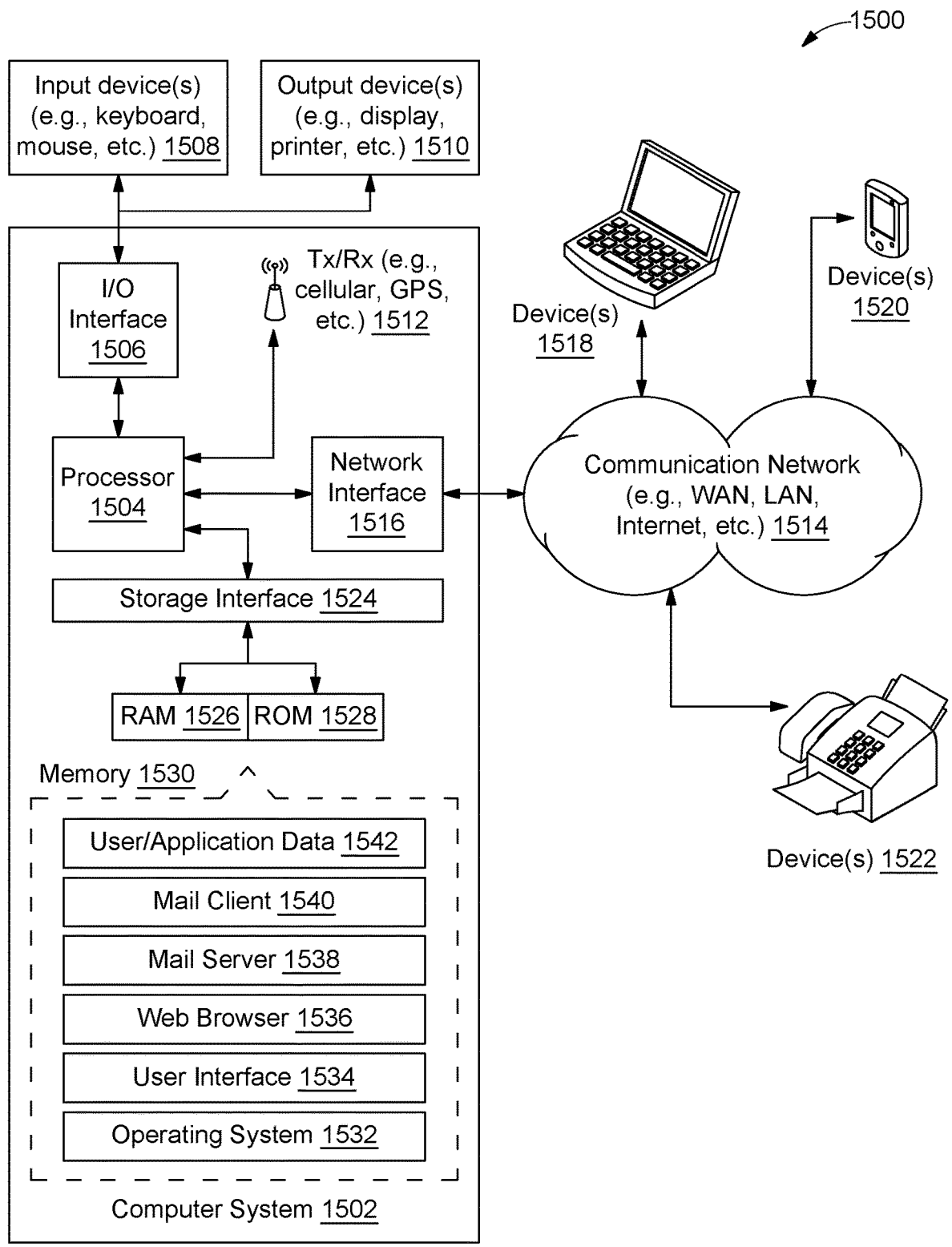
FIG. 15 illustrates a block diagram of an exemplary computer system for implementing embodiments consistent with the present disclosure.

Referring now to FIG. 15, a block diagram of an exemplary computer system 1502 for implementing various embodiments is illustrated. Computer system 1502 may include a central processing unit ("CPU" or "processor") 1504. Processor 1504 may include at least one data processor for executing program components for executing user or system-generated requests. A user may include a person, a person using a device such as such as those included in this disclosure, or such a device itself. Processor 1504 may include specialized processing units such as integrated system (bus) controllers, memory management control units, floating point units, graphics processing units, digital signal processing units, etc. Processor 1504 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors, etc. Processor 1504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1504 may be disposed in communication with one or more input/output (I/O) devices via an I/O interface 1506. I/O interface 1506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1002.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 1506, computer system 1502 may communicate with one or more I/O devices. For example, an input device 1508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1510 may be a printer, fax machine, video display (for example, cathode ray tube (CRT), liquid crystal display (LCD), light-emitting diode (LED), plasma, or the like), audio speaker, etc. In some embodiments, a transceiver 1512 may be disposed in connection with processor 1504. Transceiver 1512 may facilitate various types of wireless transmission or reception. For example, transceiver 1512 may include an antenna operatively connected to a transceiver chip (for example, TEXAS® INSTRUMENTS WILINK WL1286® transceiver, BROADCOM® BCM4550IUB8© transceiver, INFINEON TECHNOLOGIES® X-GOLD 618-PMB9800© transceiver, or the like), providing IEEE 802.6a/b/g/n, Bluetooth, FM, global positioning system (GPS), 2G/3G HSDPA/HSUPA communications, etc.

In some embodiments, processor 1504 may be disposed in communication with a communication network 1514 via a network interface 1516. Network interface 1516 may communicate with communication network 1514. Network interface 1516 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1514 may include, without limitation, a direct interconnection, local area network (LAN), wide area network (WAN), wireless network (for example, using Wireless Application Protocol), the Internet, etc. Using network interface 1516 and communication network 1514, computer system 1502 may communicate with devices 1518, 1520, and 1522. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1502 may itself embody one or more of these devices.

In some embodiments, processor 1504 may be disposed in communication with one or more memory devices (for example, RAM 1526, ROM 1528, etc.) via a storage interface 1524. Storage interface 1524 may connect to memory 1530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1530 may store a collection of program or database components, including, without limitation, an operating system 1532, user interface application 1534, web browser 1536, mail server 1538, mail client 1540, user/application data 1542 (for example, any data variables or data records discussed in this disclosure), etc. Operating system 1532 may facilitate resource management and operation of computer system 1502. Examples of operating systems 1532 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1534 may facilitate display, execution, interaction, manipulation, or operation of program components through textual or graphical facilities. For example, user interfaces may provide computer interaction interface elements on a display system operatively connected to computer system 1502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1502 may implement a web browser 1536 stored program component. Web browser 1536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1502 may implement a mail server 1538 stored program component. Mail server 1538 may be an Internet mail server such as MICROSOFT® EXCHANGE® mail server, or the like. Mail server 1538 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 1538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1502 may implement a mail client 1540 stored program component. Mail client 1540 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1502 may store user/application data 1542, such as the data, variables, records, etc. as described in this disclosure. Such databases may be implemented as fault-tolerant, relational, scalable secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

The disclosed method and system may provide some advantages like, the disclosed method and the system may accurately identify cell type of plurality of cells present with tables. In addition, the disclosed method and system may precisely identify position of key cells present anywhere within tables. Moreover, the disclosed method and the system may enable identification of key cells in tables that includes multiple sub-tables. Further, the disclosed method and the system may enable extraction and collation of analogous data present within multiple disparate tables in a single database (i.e., the central database).

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

We claim:

1. A method for transforming data organized in tabular structure, the method comprising:

assigning, by a Machine Learning (ML) model, a score to each of a plurality of cells within a table based on an associated set of orthogonal features characterizing a set of data, wherein the set of orthogonal features comprises visual features, syntactic features, and language-based features;

identifying, for each of the plurality of cells, by the ML model, a cell type based on the assigned score;

determining, by the ML model, a table type based on the cell type and the set of orthogonal features determined for each of the plurality of cells, wherein the table type comprises one of a row-oriented table, a column-oriented table, or a composite table;

rendering a user interface on an Input/Output (I/O) unit; and displaying, on the rendered user interface, at least one of the identified cell type of each of the plurality of cells, the determined table type, and the determined set of orthogonal features for each of the plurality of cells.

2. The method of claim 1, further comprising pre-processing the table, wherein the pre-processing further comprises:

unmerging one or more merged cells from the plurality of cells present within the table; and normalizing one or more of the plurality of cells based on pre-defined criteria.

3. The method of claim 1, wherein the cell type comprises one of a key cell, a value cell, or a null cell.

4. The method of claim 1, further comprising:

classifying each of the plurality of cells in one of the key cell, the value cell, or the null cell based on the identified cell type.

5. The method of claim 1, further comprising:

upon determining the table type as the composite table, iteratively splitting at least one sub-table from the composite table to create an individual table corresponding to each of the at least one sub-table.

6. The method of claim 1, wherein the determining the table type further comprises:

determining a coordinate point of each of the plurality of cells; and identifying at least one group of key cells based on the coordinate point and the cell type determined for each of the plurality of cells.

7. The method of claim 1, wherein the determining the table type further comprises:

determining a deviation in the identified cell type of one or more of the plurality of cells by performing a rule-based neighbourhood analysis, wherein the performing the rule-based neighbourhood analysis comprises:

comparing the set of orthogonal features of each of the plurality of cells with the set of orthogonal features associated with at least one neighbouring cell from the plurality of cells; and resolving the deviation identified in the cell type of the one or more of the plurality of cells based on the comparison.

8. A system for transforming data organized in tabular structure, the system comprising:

a processor;

an Input/Output (I/O) unit; and a memory coupled to the processor, wherein the memory stores processor executable instructions, which, on execution, causes the processor to:

assign a score to each of a plurality of cells within a table based on an associated set of orthogonal features characterizing a set of data, wherein the set of orthogonal features comprises visual features, syntactic features, and language-based features;

identify for each of the plurality of cells, a cell type based on the assigned score;

determine a table type based on the cell type and the set of orthogonal features determined for each of the plurality of cells, wherein the table type comprises one of a row-oriented table, a column-oriented table, or a composite table;

render a user interface on the I/O unit; and display, on the rendered user interface, at least one of the identified cell type of each of the plurality of cells, the determined table type, and the determined set of orthogonal features for each of the plurality of cells.

9. The system of claim 8, wherein the processor executable instructions further cause the processor to:

pre-process the table, and wherein, to pre-process the table, the processor executable instructions further cause the processor to:

unmerge one or more merged cells from the plurality of cells present within the table; and normalize one or more of the plurality of cells based on pre-defined criteria.

10. The system of claim 8, wherein the cell type comprises one of a key cell, a value cell, or a null cell, and wherein each of the plurality of cells is classified in one of the key cell, the value cell, or the null cell based on the identified cell type.

11. The system of claim 8, wherein the processor executable instructions further cause the processor to:

upon determining the table type as the composite table, iteratively split at least one sub-table from the composite table to create an individual table corresponding to each of the at least one sub-table.

12. The system of claim 8, wherein, to determine the table type, the processor executable instructions further cause the processor to:

determine a coordinate point of each of the plurality of cells; and identify at least one group of key cells based on the coordinate point and the cell type determined for each of the plurality of cells.

13. The system of claim 8, wherein, to determine the table type, the processor executable instructions further cause the processor to:

determine a deviation in the identified cell type of one or more of the plurality of cells by performing a rule-based neighbourhood analysis, wherein performing the rule-based neighbourhood analysis comprises:

compare the set of orthogonal features of each of the plurality of cells with the set of orthogonal features associated with at least one neighbouring cell from the plurality of cells; and resolve the deviation identified in the cell type of the one or more of the plurality of cells based on the comparison.

14. A non-transitory computer-readable storage medium having stored thereon, a set of computer-executable instructions for transforming data organized in tabular structure that when executed, cause a computer comprising one or more processors to perform steps comprising:

assigning a score to each of a plurality of cells within a table based on an associated set of orthogonal features characterizing a set of data, wherein the set of orthogonal features comprises visual features, syntactic features, and language-based features;

identifying, for each of the plurality of cells, a cell type based on the assigned score;
- determining a table type based on the cell type and the set of orthogonal features determined for each of the plurality of cells, wherein the table type comprises one of a row-oriented table, a column-oriented table, or a composite table;
- rendering a user interface on an input/output (I/O) unit; and
- displaying, on the rendered user interface, at least one of the identified cell type of each of the plurality of cells, the determined table type, and the determined set of orthogonal features for each of the plurality of cells.

* * * * *